United States Patent
Jang et al.

(10) Patent No.: US 6,842,579 B1
(45) Date of Patent: Jan. 11, 2005

(54) APPARATUS AND METHOD OF TRANSFERRING TRANSMISSION STREAM IN DIGITAL INTERFACE

(75) Inventors: Chang Hwan Jang, Kyonggi-do (KR); Nam Seok Jo, Kyonggi-do (KR)

(73) Assignee: LG Electronics Inc., Seoul (KR)

(*) Notice: Subject to any disclaimer, the term of this patent is extended or adjusted under 35 U.S.C. 154(b) by 706 days.

(21) Appl. No.: 09/627,425

(22) Filed: Jul. 27, 2000

(30) Foreign Application Priority Data

Jul. 27, 1999 (KR) ............................................. 99-30625
Jul. 27, 1999 (KR) ............................................. 99-30626

(51) Int. Cl.[7] .............................. H04N 5/91; H04N 5/85
(52) U.S. Cl. ........................ 386/83; 386/125; 386/124
(58) Field of Search .......................... 386/83, 95, 124, 386/46, 1, 92, 40, 35, 125; 360/18, 32; 725/131, 133, 139, 141, 151, 153; 348/569; H04N 5/91, 5/85

(56) References Cited

U.S. PATENT DOCUMENTS 5,619,337 A * 4/1997 Naimpally .................. 386/83

FOREIGN PATENT DOCUMENTS

WO    WO 94/18763    * 8/1994

* cited by examiner

Primary Examiner—Robert Chevalier
(74) Attorney, Agent, or Firm—Birch, Stewart, Kolasch & Birch, LLP

(57) ABSTRACT

An apparatus and method of transferring a transmission stream in a digital interface which inserts the program number selected by a user into a predetermined region of the MPEG2-TS if a multi-program is included in a channel, and transmits the MPEG2-TS including the selected program number through the digital interface to record and reproduce the MPEG2-TS. The apparatus includes a transmitting device for transmitting an input stream, a receiving device for recording and reproducing the stream, a TP demultiplexer for demultiplexing a multi-program from the input stream or a reproduced program, a recording section for recording program information selected by the user in a specified region of the demultiplexed stream, and a control section for controlling an operation of the recording section. The multi-program is transmitted to the receiving device through the digital interface, and a program selected by the user from the multi-program is selected by the receiving section.

9 Claims, 4 Drawing Sheets

FIG.1a
related art

```
Program_association_section() {
                    table_id
                    section_syntax_indicator
                    '0'
                    reserved
                    section_length
                    transport_stream_id
                    reserved
                    version_number
                    current_next_indicator
                    section_number
                    last_section_number
                    for(I=0; I<N; I++){
                              program_number
                              reserved
                              if(program_number=='0'){
                                        network_PID
                              }
                              else {
                                        program_map_PID
                              }
                    }
                    CRC_32
}
```

FIG.1b
related art

| table_ID | ind | 0 | rsvd | version_number | section_number | last_section_number |
|---|---|---|---|---|---|---|
| 8 | | | | 8 | 8 | 8 |
| transport_stream_id | | | | | | transport_stream_id |
| | | | | section_length | | |
| program_number(or 0x0000) | | | | reserved | program_map_PID(or network_PID) | |
| program_number(or 0x0000) | | | | reserved | program_map_PID(or network_PID) | |
| program_number(or 0x0000) | | | | reserved | program_map_PID(or network_PID) | |
| program_number(or 0x0000) | | | | reserved | program_map_PID(or network_PID) | |
| CRC32 | | | | | | |

FIG.3

```
private_section( ) {
            table_id
            section_syntax_indicator
            private_indicator
            reserved
            private_section_length
            if(section_syntax_indicator=='0'){
                        for(l=0; i<N; i++){
                                    private_data_byte
                        }
            }
            else{
                        table_id_extension
                        reserved
                        version_number
                        current_next_inswcator
                        section_number
                        last_section_number
                        for(ii=0;i<private_section)length;++){
                                    private_data-byte
                        }
                        CRC_32
            }
}
```

APPARATUS AND METHOD OF TRANSFERRING TRANSMISSION STREAM IN DIGITAL INTERFACE

BACKGROUND OF THE INVENTION

1. Field of the Invention

The present invention relates generally to a digital interface, and more particularly to an apparatus and method of transferring a transmission stream in a digital interface.

2. Description of the Related Art

In the existing analog type audio/video (A/V) appliance, there exists no method for controlling other peripheral devices through one device. Recently, it becomes possible as digital type A/V appliances are developed.

For instance, in a high-definition digital video cassette recorder (HD-DVCR) conference, an audio/video control command and transaction set (AV/C CTS) is defined so that a remote controller can transmit an operation command to a controlled device, which is called a local device, through an IEEE 1394 serial bus.

Here, the IEEE 1394 serial bus is the standard of a high-speed data transmission defined by Institute of Electrical and Electronics Engineers (IEEE), and is used as an interface which connects respective devices of a digital multimedia system.

The IEEE 1394 serial bus is composed of an isochronous transfer mode and an asynchronous transfer mode. The isochronous transfer mode is used for transmitting A/V data in real time, and the asynchronous transfer mode is used for asynchronously transferring transactions such as read, write, lock and so forth required for the asynchronous transfer mode communication.

Control commands such as the AV/C CTS are asynchronously transmitted using the asynchronous transfer mode.

Meanwhile, according to specifications of consumer-user digital VCRs using 6.3 mm magnetic tapes-PART 8:ATV, specifications of consumer-user digital VCRs and specifications of digital interface for consumer electronic A/V equipment-PART 1, PART 4, it is prescribed that the HDVCR using a 6.3 mm magnetic tape as a recording medium can record a moving picture experts group 2-transport stream (MPEG2-TS) type ATV broadcast transmitted using the IEEE 1394.

Especially, according to the above literature, it is prescribed that the MPEG2-TS is transmitted using the isochronous transfer mode of the IEEE 1394 with a common format in the same manner as a digital video cassette (DVC)(alias camcoder), i.e., a common isochronous packet (CIP) header structure, and the AV/C CTS is adopted as a control command.

Here, the MPEG2 is represented as three standards, MPEG2-system, MPEG2-video, and MPEG2-audio, and as the transmission standard defined in the MPEG2-system exist a transmission stream (TS) and a program stream (PS).

A program is composed of video information, audio information, and user data information, and according to the MPEG2-TS defined in the MPEG2-system, the video, audio, and user data information, which correspond to a plurality of programs, are time-divided and multiplexed in a stream.

The MPEG2-TS includes a program specific information (PSI) so that the audio, video, and user data information corresponding to a desired program are properly analyzed when the MPEG2-TS is demultiplexed in the receiving part.

The PSI has the form of a table in most cases, and a program allocation table (PAT), program map table (PMT), and conditional access table (CAT) exist as representative tables.

The most important tables are the PAT and the PMT among them. The PMT exists for each program, and is a table wherein packet identifications (PIDs) for transmission stream packets including a video stream and an audio stream of a corresponding program are arranged in items. The video stream is represented as PID=XXXX, and the audio stream as PID=YYYY.

The packet of the transmission stream has a fixed length of 188 bytes, and since a plurality of programs generally exist in a transmission stream (TS), a plurality of PMTs exist in a transmission stream (TS).

Accordingly, a general table for connecting a plurality of programs transmitted in the transmission stream to the PIDs for the PMT of the respective program is required, and this general program is just the PAT.

Since one program is represented by one program number, the items of the PAT mostly correspond to information representing the program number=XXXX and the relation to the PMT PID.

Hereinafter, the conventional apparatus and method of transferring a transmission stream in a digital interface will be explained with reference to the accompanying drawings.

FIGS. 1a and 1b are views illustrating the syntax and structure of the PAT used in the conventional IEEE 1394 serial bus.

In the MPEG2-TS currently used in the broadcasts, the PAT information, as shown in FIGS. 1a and 1b, should be necessarily used to decode the stream. Also, between the appliances using the digital interface such as the IEEE 1394 should be necessarily exchanged the PAT information in case of storing or reproducing the MPEG2-TS.

The conventional method of transferring the PAT information is classified into following three methods: a first method of transferring all the PAT information that one source data has, a second method of transferring the program number of the program currently transmitted using a command set of the IEEE 1394, and a third method of modifying the PAT information itself in the source side that transfers the PAT information, and transferring the modified PAT information.

According to the first method, however, since all the PAT information in one source is transferred without modification, a problem may occur when a multi-program is transferred. Specifically, in case that a specified program is reproduced after only the specified program among the transferred multi-program is recorded by a user, the reproducing apparatus may judge that the multi-program exists since the PAT information has all the information on the multi-program, and thus a malfunction may occur during reproduction.

SUMMARY OF THE INVENTION

Accordingly, the present invention is directed to an apparatus and method of transferring a transmission stream in a digital interface that substantially obviate one or more of the problems due to limitations and disadvantages of the related art.

An object of the present invention is to provide an apparatus and method of transferring a transmission stream in a digital interface which inserts the program number selected by the user into a predetermined region of the MPEG2-TS if a multi-program is included in a channel, and transmits the MPEG2-TS including the selected program number through the digital interface to record and reproduce the MPEG2-TS.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the transmission stream transferring apparatus in a digital interface having a transmitting device for transmitting an input stream and a receiving device for recording and reproducing the stream, comprises a TP demultiplexer for demultiplexing a multi-program from the input stream or a reproduced program, a recording section for recording program information selected by a user in a specified region of the demultiplexed stream, and a control section for controlling an operation of the recording section, wherein the multi-program is transmitted to the receiving device through the digital interface, and a program selected by the user from the multi-program is selected by the receiving section.

The recording section may be a private section insertion section for inserting the program information selected by the user in a private section region separately provided in the demultiplexed stream. The program information may be a program number.

In another aspect of the present invention, there is provided a transmission stream transferring method in a digital interface whereby a transmitting section digital-interfaces a multi-program included in a channel selected by a user from an input stream to a receiving section to record and reproduce the multi-program, the method comprising the steps of the user selecting a certain program information from the multi-program included in the channel, and the transmitting section inserting the selected program information into a private section region of the stream and storing the program information in the receiving section through the digital interface.

In still another aspect of the present invention, there is provided a transmission stream transferring method in a digital interface for recording and reproducing a multi-program included in a channel selected by a user from an input stream, the method comprising the steps of the user selecting a certain program information from the multi-program included in the channel, a transmitting section recording the selected program in a predetermined region of a program allocation table (PAT) and storing the selected program in a receiving section through the digital interface, and transmitting the program to the transmitting section through the digital interface.

The predetermined region may be a reserved region of the PAT, and a program number may be recorded in the reserved region.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 1a and 1b are views illustrating the syntax and structure of the PAT used in the conventional IEEE 1394 serial bus.

FIG. 3 is a view illustrating a private section syntax in the recording section of FIG. 2 according to the present invention.

DETAILED DESCRIPTION OF THE PREFERRED EMBODIMENTS

Figure 2:
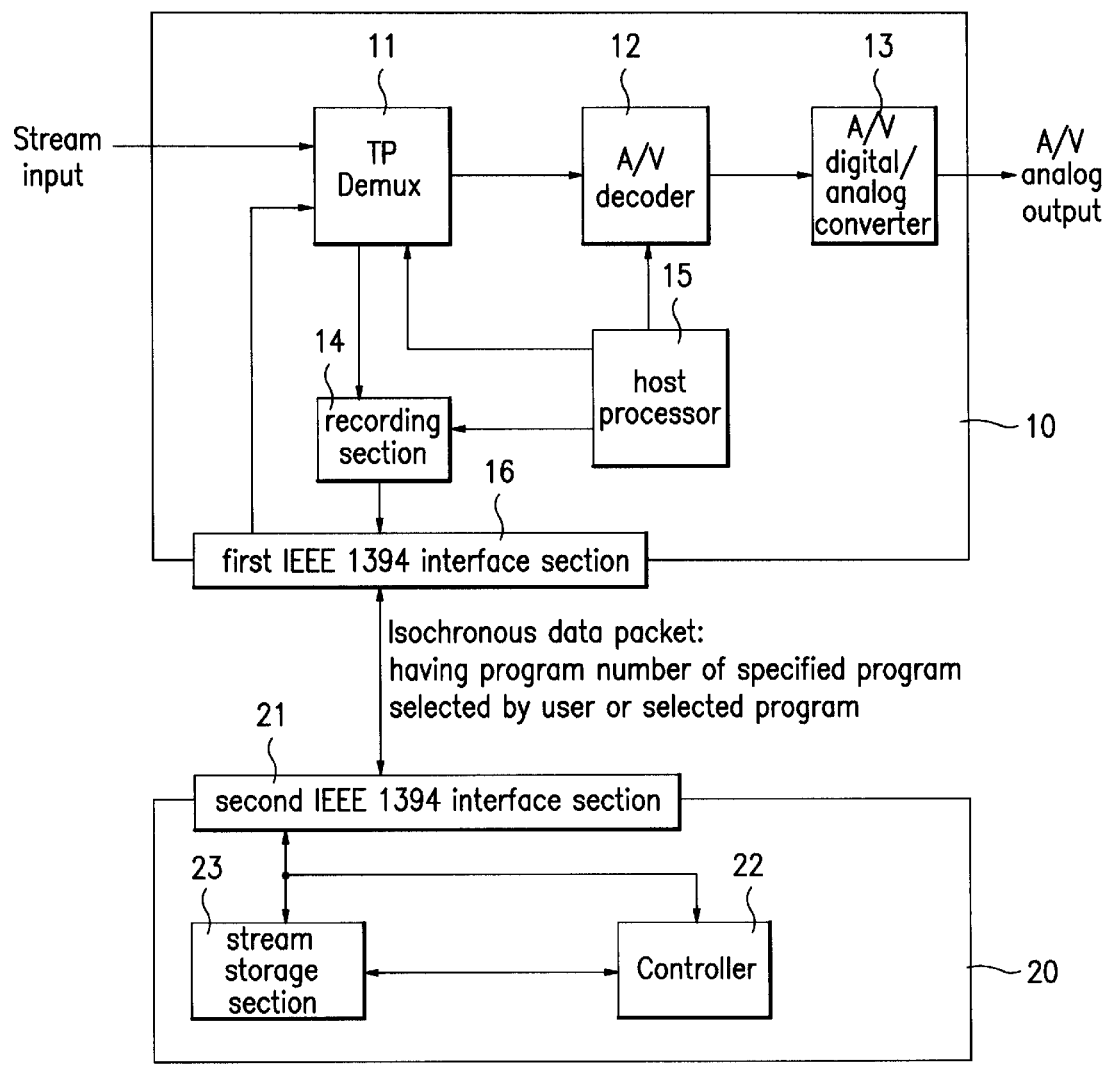
FIG. 2 is a block diagram illustrating the construction of a transmission stream transferring apparatus in a digital interface according to an embodiment of the present invention.

Reference will now be made in detail to the apparatus and method of transferring a transmission stream in a digital interface according to the preferred embodiments of the present invention, examples of which are illustrated in the accompanying drawings.

FIG. 2 is a block diagram illustrating the construction of a transmission stream transferring apparatus in a digital interface according to an embodiment of the present invention. The apparatus includes a transmitting device 10 such as a DTV, STB, and so forth, and a receiving device 20 such as a DVCR, DVDR, and so forth.

The transmitting device 10 comprises a TP demultiplexer 11 for demultiplexing a multi-program from an input stream or a reproduced program, an A/V decoder 12 for decoding an audio/video (A/V) from the demultiplexed program, an A/V digital-to-analog (D/A) converter 13 for converting the decoded audio/video into an analog audio/video, a recording section 14 for recording the program number selected by a user in a predetermined region in the demultiplexed program, a host processor 15 for controlling the whole operation of the transmitting device, and a first IEEE 1394 interface section 16 for converting the program whose number is recorded by the recording section 14 into an IEEE 1394 format to interface the program or for extracting the multi-program from an interfaced signal of the IEEE 1394 format to output the multi-program.

The receiving section 20 comprises a second IEEE 1394 interface section 21 for extracting the multi-program from a signal of the IEEE 1394 format transmitted from the first IEEE 1394 interface section 16 to output the multi-program or for converting the reproduced program into the signal of the IEEE 1394 format to interface the program, a controller 22 for controlling recording/reproduction of the program in accordance with a signal outputted from the second IEEE 1394 interface section 21, and a stream storage section 23 for recording the program outputted from the second IEEE 1394 interface section 21 or for outputting the recorded program.

The recording section 14 in the transmitting device 10 operates in two ways as follows.

First, the program number selected by the user from the multi-program inputted from the TP demultiplexer is recorded in the reserved region of the PAT or PMT, and then the selected program number is stored in the receiving section 20 through the first IEEE 1394 interface section 16.

Second, a separate table named private_section ( ); is provided without reconstructing a separate region in the PAT or PMT, the selected program number is recorded in the private_sections ( );, and then stored in the receiving section 20 through the first IEEE 1394 interface section 16.

Hereinafter, the above-described two cases will be explained in detail as first and second embodiments of the present invention.

First Embodiment

According to the first embodiment, the selected program is recorded in the separate reserved region of the PAT or PMT.

First, if the user selects a specified channel to view the corresponding channel broadcasting program, the host processor 15 in the transmitting device 10 controls a tuner (not illustrated) to tune the selected channel. The TP demultiplexer 11 demultiplexes the tuned channel to the multi-program in accordance with the control signal of the host processor 15.

Accordingly, the host processor 15 displays the demultiplexed multi-program through a display device (not illustrated), so that the user can view the program.

If the user selects the program number which he/she desires to view among the displayed multi-program, the host processor 15 controls the TP demultiplexer 11 to demultiplex the program corresponding to the selected program number.

Thereafter, the A/V decoder 12 decodes and outputs the audio/video in the demultiplexed program in accordance with the control signal from the host processor 15.

Then, the A/V digital-to-analog converter 13 converts the decoded audio/video into an analog audio/video, and displays the program corresponding to the selected program number.

In this state, if the user selects the number of the corresponding program to store the program being viewed or another program, the host processor 15 controls the TP demultiplexer 11 to demultiplex the multi-program included in the channel to the PAT controller 14, and outputs to the PAT controller 14 a control signal for recording the program corresponding to the selected number in the predetermined region of the PAT controller 14. The TP demultiplexer 11 demultiplexes the multi-program to the PAT controller 14 in accordance with the control signal from the host processor 15.

Thereafter, the PAT controller 14 searches the program corresponding to the program number selected by the user among the demultiplexed multi-program, and records the selected program number in the predetermined region in the PAT information of the corresponding program to output the program.

The predetermined region is the reserved region in the PAT information.

The first IEEE 1394 interface section 16 converts the output signal of the PAT controller 14 into the IEEE 1394 format, and transmits a converted signal to the receiving device 20 as the isochronous data packet.

The second IEEE 1394 interface section 21 in the receiving device 20 extracts the multi-program from the isochronous data packet interfaced through the first IEEE 1394 interface section 16 in the transmitting section 10, and stores the multi-program in the stream storage section 23.

Thereafter, if the user intends to reproduce the program stored in the receiving device 20, the host processor 15 outputs the control signal for reproducing the program corresponding to the program number, and outputs the number of the corresponding program to the TP demultiplexer 11.

The first IEEE 1394 interface section 16 converts the program reproduction control signal from the host processor 15 into the asynchronous data packet, and interfaces the data packet to the receiving device 20.

Accordingly, the second IEEE 1394 interface section 21 extracts the program reproduction control signal selected by the user from the asynchronous data packet interfaced through the first IEEE 1394 interface section 16 of the transmitting device 10, and outputs the program reproduction control signal to the controller 22.

Then, the controller 22 compares the program information selected by the user with the information in the predetermined region of the PAT information in the multi-program stored in the stream storage section 23 in accordance with the program reproduction control signal, and outputs a control signal for extracting the program corresponding to the program number which the user intends to reproduce from the stream storage section 23 in accordance with a result of comparison.

Thus, the stream storage section 23 outputs only the program corresponding to the program number which the user intends to reproduce among the stored multi-program in accordance with the control signal of the controller 22.

The second IEEE 1394 interface section 21 converts the program outputted from the stream storage section 23 into the IEEE 1394 format, and interfaces the converted program to the receiving device 10 as the isochronous data packet.

Accordingly, the first IEEE 1394 interface section 16 in the receiving device 10 extracts the program selected by the user from the isochronous data packet interfaced through the second IEEE 1394 interface section 21, and outputs the extracted program to the TP demultiplexer 11.

The TP demultiplexer 11 then demultiplexes the program outputted from the first IEEE 1394 interface section 16 in accordance with the control signal from the host processor 15 to output the demultiplexed program.

Then, the A/V decoder 12 decodes the audio/video from the program demultiplexed by the TP demultiplexer 11 to output the decoded audio/video.

The A/V digital-to-analog converter 13 converts the audio/video decoded by the A/V decoder 12 into an analog audio/video, and displays the analog audio/video through the display device.

Second Embodiment

According to the second embodiment, a separate table named private_section ( ); is prepared, and the number of the selected program is recorded in the table.

In the second embodiment, the PAT controller 14 used in the first embodiment is replaced by a private_section insertion section. The operation of the whole system is the same as that of the first embodiment, and the explanation of the whole operation will be omitted.

The operation of the system according to the private_section insertion section will be explained.

FIG. 3 shows the private_section syntax of the private_section insertion section of FIG. 2.

Referring to FIG. 3, the term 'table_id' indicates a value informing that a private table belongs to this section, and the term 'section_syntax_indicator' is classified into '0' indicating that a private_data_byte follows a private_section_length field, and '1' indicating that an extension type follow the private_section_length field. 'Private_indicator' indicates a bit which can be defined and used by the user, and 'private_section_length' indicates the number of bytes remaining in the private_section ( );. 'Private_data_byte' indicates a region which can be defined and used by the user, and that the program number selected by the user is recorded, and 'table_id_extension' indicates a region which can be defined and used by the user. 'Version_number' indicates a value increased by '1' when the information used in the private section is changed, and 'current_next_indicator' is classified into '1' indicating the version number that is applied to the current private_section, and '0' indicating the version number that is to be applied to the next private_section. The first 'section_number' in the private table is 0×00, this section_number is increased by '1', and the 'last_section_number' indicates the last section number. 'CRC_' indicates a value of CRC.

Accordingly, the TP demultiplexer 11 demultiplexes the multi-program to the private_section insertion section 14 in accordance with the control signal from the host processor 15.

Then, the private_section insertion section 14, under the control of the host processor 15, inserts the program corresponding to the program number selected by the user among the multi-program demultiplexed by the TP demultiplexer 11 into the private_section region in the MPEG2-TS in accordance with the private_section syntax as shown in FIG. 3, and output the program.

The first IEEE 1394 interface section 16 converts the output signal of the private_section insertion section 14 into the IEEE 1394 format, and transmits a converted signal to the receiving device 20 as the isochronous data packet.

The second IEEE 1394 interface section 21 in the receiving device 20 extracts the MPEG2-TS from the isochronous data packet interfaced through the first IEEE 1394 interface section 16 in the transmitting section 10, and stores the MPEG2-TS in the stream storage section 23.

Thereafter, if the user intends to reproduce the program stored in the receiving device 20, the host processor 15 outputs the control signal for reproducing the program corresponding to the program number, and outputs the number of the corresponding program to the TP demultiplexer 11.

The first IEEE 1394 interface section 16 converts the program reproduction control signal from the host processor 15 into the asynchronous data packet, and interfaces the data packet to the receiving device 20.

Accordingly, the second IEEE 1394 interface section 21 extracts the program reproduction control signal from the asynchronous data packet interfaced through the first IEEE 1394 interface section 16 of the transmitting device 10, and outputs the program reproduction control signal to the controller 22.

Then, the controller 22 outputs a control signal for extracting the program corresponding to the program number which the user intends to reproduce from the stream storage section 23 in accordance with the program reproduction control signal.

Thus, the stream storage section 23 searches the private_section region of the stored MPEG2-TS in accordance with the control signal from the controller 22, and outputs only the program corresponding to the program number which the user intends to reproduce among the multi-program.

The second IEEE 1394 interface section 21 converts the program outputted from the stream storage section 23 into the IEEE 1394 format, and interfaces the converted program to the receiving device 10 as the isochronous data packet.

Accordingly, the first IEEE 1394 interface section 16 in the receiving device 10 extracts the program corresponding to the program number selected by the user from the isochronous data packet interfaced through the second IEEE 1394 interface section 21, and outputs the extracted program to the TP demultiplexer 11.

The TP demultiplexer 11 then demultiplexes the program outputted from the first IEEE 1394 interface section 16 in accordance with the control signal from the host processor 15 to output the demultiplexed program.

Then, the A/V decoder 12 decodes the audio/video from the program demultiplexed by the TP demultiplexer 11 to output the decoded audio/video.

The A/V digital-to-analog converter 13 converts the audio/video decoded by the A/V decoder 12 into an analog audio/video, and displays the analog audio/video through the display device.

As described above, according to the transmission stream transferring apparatus and method in a digital interface according to the present invention, if a multi-program is included in a channel, the program number selected by the user is inserted into a specified region of the MPEG2-TS, and is transmitted through the digital interface to be recorded and reproduced, so that the malfunction which may occur during the recording/reproduction of the selected program can be prevented.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A transmission stream transferring apparatus in a digital interface having a transmitting device for transmitting an input stream and a receiving device for recording and reproducing the stream, the apparatus comprising:
   a TP demultiplexer for demultiplexing a multi-program from the input stream or a reproduced program;
   a recording section for recording program information selected by a user in a specified region of the demultiplexed stream; and
   a control section for controlling an operation of the recording section;
   wherein the multi-program is transmitted to the receiving device through the digital interface, and a program selected by the user from the multi-program is selected by the receiving section.

2. The transmission stream transferring apparatus as claimed in claim 1, wherein the recording section is a private section insertion section for inserting the program information selected by the user in a private section region separately provided in the demultiplexed stream.

3. The transmission stream transferring apparatus as claimed in claim 1, wherein the recording section is a program allocation table (PAT) controller for recording the program information selected by the user in a specified region of PAT information in the demultiplexed stream.

4. The transmission stream transferring apparatus as claimed in claim 2, wherein the program information is a program number.

5. A transmission stream transferring method in a digital interface whereby a transmitting section digital-interfaces a multi-program included in a channel selected by a user from an input stream to a receiving section to record and reproduce the multi-program, the method comprising the steps of:
   the user selecting a certain program information from the multi-program included in the channel; and
   the transmitting section inserting the selected program information into a private section region of the stream and then storing the program information in the receiving section through the digital interface.

6. A transmission stream transferring method in a digital interface for recording and reproducing a multi-program included in a channel selected by a user from an input stream, the method comprising the steps of:

the user selecting a certain program information from the multi-program included in the channel;

a transmitting section recording the selected program in a predetermined region of a program allocation table (PAT) and storing the selected program in a receiving section through the digital interface; and transmitting the program to the transmitting section through the digital interface.

7. The transmission stream transferring method as claimed in claim 6, wherein the predetermined region is a reserved region of the PAT information.

8. The transmission stream transferring method as claimed in claim 7, wherein in the reserved region is recorded a program number.

9. The transmission stream transferring apparatus as claimed in claim 3, wherein the program information is a program number.

* * * * *